United States Patent [19]

Hoffman

[11] 4,200,354
[45] * Apr. 29, 1980

[54] MICROSCOPY SYSTEMS WITH RECTANGULAR ILLUMINATION PARTICULARLY ADAPTED FOR VIEWING TRANSPARENT OBJECTS

[76] Inventor: Robert Hoffman, 17 Copper Beech Pl., Merrick, N.Y. 11566

[*] Notice: The portion of the term of this patent subsequent to Apr. 29, 1997, has been disclaimed.

[21] Appl. No.: 898,647

[22] Filed: Apr. 21, 1978

Related U.S. Application Data

[63] Continuation of Ser. No. 503,394, Sep. 5, 1974, abandoned.

[51] Int. Cl.² ............................................. G02B 21/14
[52] U.S. Cl. .......................................................... 350/13
[58] Field of Search ...................... 350/12, 13, 162 SF

[56] References Cited

U.S. PATENT DOCUMENTS

| | | | |
|---|---|---|---|
| 2,427,689 | 9/1947 | Osterberg et al. | 350/13 |
| 2,706,253 | 4/1955 | Hutchins et al. | 356/51 |
| 2,950,648 | 8/1960 | Rhodes | 350/13 |

*Primary Examiner*—Jon W. Henry
*Attorney, Agent, or Firm*—Arthur L. Plevy

[57] ABSTRACT

A modulation contrast microscope employs a closely wound lamp filament of a rectangular configuration as an illuminating source. The image of the filament is registered on a Fourier plane to which plane a modulator is located which serves to render phase gradients in phase objects visible by functioning to provide light amplitude differences in accordance with modifying the amplitude of the light beam relatively about a given region in both a greater and lesser intensity.

9 Claims, 11 Drawing Figures

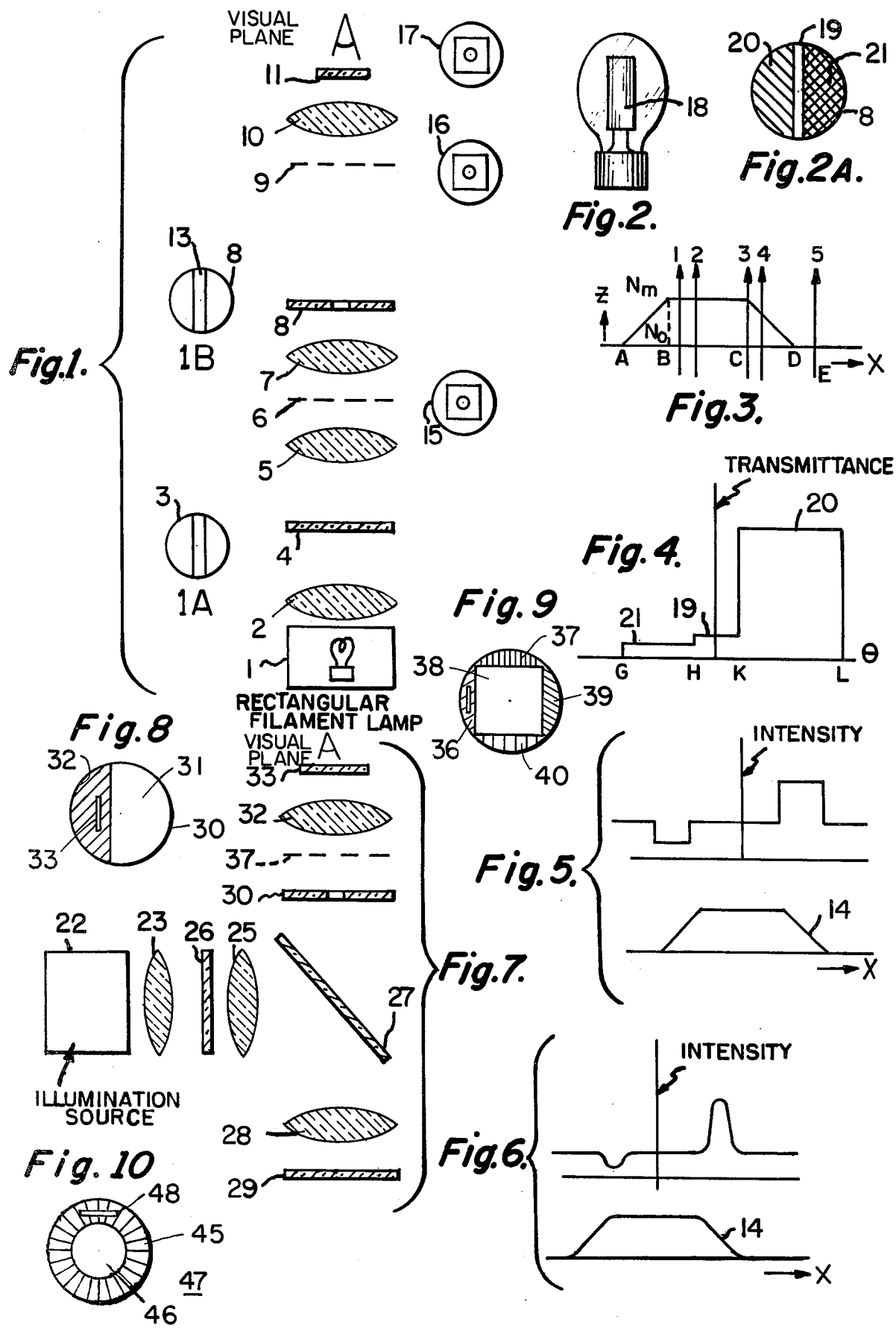

MICROSCOPY SYSTEMS WITH RECTANGULAR ILLUMINATION PARTICULARLY ADAPTED FOR VIEWING TRANSPARENT OBJECTS

This is a continuation of application Ser. No. 503,394, filed Sept. 5, 1974 now abandoned.

BACKGROUND OF INVENTION

This invention relates to optical systems in general and more particularly relates to an improved apparatus particularly adapted for use with a microscope system to enable a user to view phase or transparent objects.

The prior art is cognizant of the fact that certain objects cannot be seen with the ordinary microscope with ordinary illumination. Such objects are virtually transparent under such ordinary conditions and are sometimes referred to as phase objects.

For example such an object may occupy a thin, transparent, but inhomogeneous layer consisting, for instance, of an optically denser body embedded in a rarer surrounding medium, with a relatively sharp boundary between them. Both the object and the medium will have relatively equal transmittance but will also possess a difference in phase.

In an ordinary microscope phase differences ensure equality of intensity and therefore the object is indistinguishable from the medium or the object image is indistinguishable from the adjacent image.

Furthermore, since the eye is sensitive to intensity and not to phase, such objects are invisible, even though these objects retard or advance the phase of the light wave passing therethrough.

There exists a number of specialized microscopes which enable a user to view such phase objects. Such devices are referred to in the prior art as phase-contrast microscopes and interference microscopes. A good description of such devices appears in a book entitled "Analytical Cytology" by R. Barer, Chapter 3, published by McGraw-Hill, N.Y. (1965). The phase contrast microscope sometimes referred to as the Zernike phase contrast microscope employs a phase plate. Such a plate has an annular central region which coincides with an annular opening in a source housing, the central region is formed, for example, by the deposition of a ring of a phase altering medium which has in addition, an absorbing medium, serving to give all light arriving at the image through the central region a path differing by one quarter of a wave length from the light that misses the central region. Thus due to this region, the image of the object is either brighter or fainter than that of the surroundings, depending upon the phase difference introduced at the phase plate. In such a system, defracted light passing the central region produces halos around the image.

The interference microscope is also a phase device and operates by also introducing an inhomogenity to cause a phase shift to thereby enable one to distinguish the object from the surrounds. A disadvantage of the interference microscope is the loss of light at the several semi-reflecting surfaces and the need for polarization and its dependence on strain free optical parts and finally the high precision required to construct the optical birefringent elements. Such devices are in widespread use in the study of tissue masses and related fields.

Recently a new device which is the subject matter of my co-pending application Ser. No. 476,518 filed on June 5, 1974 and entitled MODULATION CONTRAST MICROSCOPE, has been discovered.

This device operates on the amplitude of the beam of light passing through a phase object. By operating on selected portions of the amplitude of light passing through the Fourier plane of an optical system as existing in a compound microscope, one can render a transparent object's phase gradients visible by converting the phase information to intensity variations at the the real image plane of the microscope. The application describes a unique and inexpensive modulator positioned at the Fourier plane and having different transmitting regions serving to create light amplitude differences which operate to render such phase objects completely visible.

BRIEF DESCRIPTION OF PREFERRED EMBODIMENT

The present invention overcomes the limitations of the phase contrast microscope and the interference microscope. Objects are rendered visible in a simpler manner, utilizing less expensive components. To accomplish this, the present invention, an apparatus for examining microscope transparent objects, consists of a compound microscope wherein means are provided for illuminating the object with a controlled beam of light. Further means are included for selectively modulating the amplitude of portions of this beam after it has passed through the object. The beams subsequently combine to interfere in the image whereon phase gradients in the object are rendered visible.

One means for producing a controlled beam of illumination of the object is by a closely wound lamp filament of a generally rectangular configuration and positioned in a plane conjugate to the Fourier transform plane. Then the condenser and objective of the microscope image the filament to create a Fourier transform plane. A sectionalized density light modulator is located at the Fourier transform plane such that the image of the filament falls on and is matched to a specific region of the modulator. In the absence of an object, all of the light passing through the microscope passes through this matching region. At either side of this specific region are two regions of different densities or optical transmittances such that the light passed by the modulator on one side of the filament image is of much greater intensity than on the other side of the image. Light passing through this novel modulator is distributed in the image plane of the microscope, selectively interferes, rendering phase gradients visible. The relative brightness of the gradient to the background intensity is the ratio of the distance the image of the filament is displaced to the width of the matched region of the modulator.

BRIEF DESCRIPTION OF THE DRAWINGS

FIG. 1 is a diagram in elevation of one embodiment of the optical elements shown schematically along the optical axis of the microscope;

FIGS. 1A to 1B are schematic diagrams of optical components of FIG. 1 shown in plan view;

FIG. 2 is a diagramatic plan view of a lamp assembly to be used with the invention.

FIG. 2A is a diagramatic plan view of a modulator in the Fourier transform plane back of the objective;

FIG. 3 is a schematic showing the method of operation and principles underlying the invention;

FIG. 4 is a graph showing the relative light transmittance qualities of one form of the modulator used in the invention;

FIG. 5 is a representation of a trapezoidal shaped object being viewed and a graphical indication of its image through the microscope.

FIG. 6 is a view similar to FIG. 5, but showing an object of arcuately configurated portions as viewed; and FIG. 7 is a schematic diagram of another form of the invention for observing opaque objects by reflection.

FIG. 8 is a planar view of a modulator of a configuration according to this invention.

FIG. 9 is a planar top view of a different embodiment of a modulator.

FIG. 10 is still an alternate embodiment of a modulator according to this invention.

DETAILED DESCRIPTION OF THE INVENTION

As indicated above the co-pending application describes a microscope utilizing modulation contrast to enable determination of a phase object. The application described the modulator in detail as well as the use of an arbitrary aperture or slit which is used to create the Fourier plane or the plane whereat the modulator member has been located. It has been determined as will be described that the slit or aperture can be eliminated and replaced in function with a lamp. The lamp has a filament of a ribbon shape or a closely wound filament. The essential characteristic is that the filament of the lamp is relatively flat and rectangular. In this manner the image of the filament is made to coincide with and fall directly upon the Fourier plane and hence the modulator located thereat. Due to the elimination of the aperture, one thereby obtains an increased efficiency in that a greater intensity and uniformity of light is present at the modulator or at the Fourier plane.

In the detailed description to follow, certain numerals have been used throughout the various figures to designate like components. While the context of the description involves the use of the modulator and technique in the environment of a compound microscope, it is anticipated that the technique and structure will have applicability and advantages in the general field of optical instruments.

Referring to FIG. 1, there is shown a compound microscope encompassing the present invention. Numeral 1 references an illuminating source which comprises an incadescent or similar lamp of the type possessing a closely would filament, which is generally flat and rectangular in shape and sometimes referred to as a ribbon filament. Examples of a suitable lamp is the 9A/TA-6 volt lamp which is manufactured by many corporate entities.

The light from the ribbon-like filament of the illuminating source 1 is brought into focus by the condensor lens 5 and the objective 7 to create the Fouriers transform plane, which defines the location of the modulator 8. The Fourier plane thus described is created by the focussing or concentration of the image of the lamp assembly 1 upon the central region of the modulator 8 (to be described).

For a clear description of the invention, the images produced at all planes conjugate to the illuminating source aperture are shown in plan view on the left of FIG. 1. A view of the object or specimen and its corresponding images produced in the subsequent conjugate planes are shown in plan view on the right.

The filament of the lamp 1 may be first focussed by means of the focussing lens 2 which is a typical component of an ordinary microscope. The lens 2 functions, in general, to aid in enlarging or reducing the filament image to assure that the same can be accurately registered upon the central region of the modulator 8 as located at the Fourier plane. An optically plane glass plate or prism 4 may be located before the condensor 5 as shown, or located elsewhere or eliminated depending upon the optical system employed. The optical plate 4 can be rotated or tilted about its axis and serves as adjusted to shift the image of the filament with respect to the matching region 19 of the modulator 8. This operation permits a user of the device to control the extent of the modulation contrast. The beam of light or the image of the lamp filament is the conventionally spread by the condensor 5 to emcompass or cover the full field of the microscope while the specimen or subject is positioned in the object plane 6.

The beam passes through the object plane 6 and thence through the objective 7 which serves to register the image of the lamp filament into focus in the Fourier transform plane 8 which is, as shown, located behind or in back of the objective 6. However, it is understood that many Fourier planes exist and in actual practice the plane could be located in front of the objective 6 and retain many of the advantages of this invention.

In any event, the image of the filament is accurately registered upon the modulator 8, which is positioned in this plane. Registration is obtained when all the light as focussed and representative of the lamp filament, during the absence of an object at the object plane 6, passes through the central matching portion 19 of the modulator (see FIG. 2A).

The specimen or object 15 in the plane 6 is imaged by the objective and produces a real image 16 at the image plane 9. The image plane 9 is the real image plane as understood in conventional microscopy terminology. The ocular 10 is located before the visual plane 11, whereat a camera, film or the eye of an observer can be positioned to either view, store, photograph or process the image of the object 15.

While the other noted co-pending application described an aperture to aid in the forming of an image to be focussed on the modulator 8, this aperture can be replaced with the lamp filament 18 construction as shown in FIG. 2 for example.

Many lamps exist whose filaments are closely wound. Suitable types are used in the auto industry. Basically, certain of these filaments are cylindrically wound and appear relatively rectangular in shape and in plan view. There are also round wire filaments which also appear rectangular in plan view. Certain manufacturers provide a lamp assembly with a flat ribbon filament. Any such device will work as long as the illumination or intensity is uniform and as long as the filament's image is capable of being focussed or registered at the Fourier plane as in a uniform light pattern. Thus the filament shape is important, but not critical, as long as the functional aspects are met and hence a great variety of commercially available lamps are suitable.

The modulator 8 located at the Fourier transform plane appears in FIG. 2A.

As indicated during the absence of any object at the object plane 6, the image of the rectangular filament is focussed by the optical system only on the central region 19 of the modulator 8. This central region has a given transmittivity selected to absorb some of the light passing therethrough and to transmit the remainder. The transmitted light becomes determinative of the background illumination and regions of the object with no phase gradient to enable one to view a phase or other specimen with viewable and clear contrast effects.

On either side of the central region 19 of the modulator 8 are located regions 20 and 21. Each region 19, 20 and 21 has a different transmittance from each other with the outer region 20 having a greater transmittance than 19, whose transmittance is greater than 21. A graph (FIG. 4) of the transmittance across a diameter of the modulator illustrates one of the many alternatives of transmittance selections for the designated modulator regions. It is noted that the graph depicts relationships which are illustrative only and the relative levels can vary therefrom. Although FIG. 2A shows a modulator having a central stripe 19 other configurations would suffice as well as long as a given region is in fact surrounded by or associated with at least another region of varying transmittance.

THEORY OF OPERATION

Now assume a transparent object or a phase object is placed at the object plane 6. In such an object as above described the amplitude or intensity variation of light passing through are unobservable with ordinary microscopes and hence one cannot distinguish the object from the background. However such an object has a phase gradient which causes directional phase shifts of the illuminating beam. The phase gradient is due to refractive index differences and thickness differences. Hence the phase object causes light to be refracted out of the central region 19 of the modulator 8.

For example, assume the object to be viewed is a transparent, flattened disk such as many tissue cells. The cell differs in refractive index from the surrounding medium. The edge between the cell and the medium approximates a prism in shape. Light entering the object plane where the cell is located, will be deflected towards the base of the prism at the bottom of the cell. This, in effect, shifts the image of the filament or illuminating source in the Fourier plane to one side or the other, depending upon the refractive index. Similarly, light entering the other side of the cell will encounter what approximates a prism deflecting light in the same manner to the other side. A gradient, or slope, can be viewed as a tiny prism. As a result of all these refractions, there will be a deviation of light from the central region to either the less optically dense side of the modulator or the more optically dense side of the modulator. In the formation of the real image, the microscope optics combine light from all portions of the modulator, the resultant interference producing the contrast in the observed image. Light from refractive index gradients deviated in one direction has been transmitted at greater intensity than light from refractive index gradients deviated in the other direction. Such rays, when they meet at the image, will not cancel. A visible image will then result for phase objects.

This effect is available when one considers that the Fourier transform plane not only distribute the spatial frequencies of the object, but also distributes the maximum energy for each point on the gradient of the subject.

The term modulation contrast is used as the system operates to create light amplitude differences about the central region in both a greater and lesser intensity. Thus the regions about the central region have a greater and a lesser transmittivity to produce the above described results.

The simplicity of the modulator 8 is understood and actually the modulator 8 can be fabricated from a film as used in photography. The surface as shown in FIG. 2A can be provided by simply exposing the film according to the desired configuration shown and with light necessary to obtain the three regions of different transmittivity. Other techniques such as optical coatings on glass, plastic and so on can be used as well. One therefore can understand that the technique enables viewing of phase objects at a significant reduction in cost over the phase contrast and or the inferference techniques.

An idealized phase object is shown in FIG. 3. The phase of ray 1 and 2 can be expressed as $e^{-i\delta}$ where $\delta$ is the phase difference with respect to a wave 5, $e^{-iKAZ}$ not passing through the object. The phase of ray 3 and 4 can be expressed as $e^{-i\phi X}$.

Since $e^{-iKZ3}$ is ray 3 and $e^{-iKZ4}$ is ray 4 where $K = (No-Nm)K_A$ where No is the refractive index of the phase object and Nm is the refractive index of the outside medium, the slope of the edges of the object, $\tan \alpha$ is $$\frac{\Delta Z}{\Delta X}$$

and as $\Delta X$ approaches zero, $\tan \alpha$ approaches $$\frac{dZ}{dX}.$$

the slope or gradient for this illustration is related to $Z = X \tan \alpha$ thus $\phi = K \tan \alpha$. Then at the Fourier transform plane considering only one lateral dimension, the amplitude $\sqcup_{(\theta)}$ closely approximates a Fourier integral, $$\sqcup_{(\theta)} = \int_{-D/2}^{+D/2} e^{-i\phi x} e^{-i\theta x_\alpha 1} X$$

Where d is the dimension of the phase object such that $$D = \frac{2\pi d}{\lambda}$$

and $\theta$ is the angular dimension on the Fourier plane which yields the solution for the region A to B of:

$$\sqcup_{(\theta)} \approx \frac{D \sin [D/2 (\theta - \phi)]}{D/2 (\theta - \phi)}$$

For the slope C to D, the value for $$\sqcup_{(\theta)} \approx \frac{D \sin [D/2 (\theta + \phi)]}{[D/2 (\theta + \phi)]}$$

Maximum energy appears at the Fourier transform plane when $$\theta \pm \phi = 0$$
$$\theta = \pm \phi$$

therefore, zero order (maximum amplitude cannot occur at $\theta=0$ or the center of the image of the source when a phase gradient is present. $\theta$ is directly proportional to the phase gradient from the center and thus distributes the maximum energy of the source away from the center. This energy can be selectively absorbed by a transmittance transfer function at the Fourier plane in the form of a modulator. The modulator regions (FIG. 4) consist of a central narrow strip 19 and side regions 20, 21. The dimensions in the Fourier transform plane are, the densest region of the modulator, GH,21, the central region, HK, 19, and the less dense region KL20, where H and K correspond to $\pm\theta_w$; G and L the widest dimension of the modulator corresponds to $\pm\theta_c$, the angle that represents the cut-off frequency of the transfer function of the optical system. In FIG. 4B, the transmittance function T is selected (one of many possibilities) so that $$T_{cwtocc} >> T \pm \theta_w > T \cdot \theta w_{to} \theta_c$$

The intensity variation for the object of FIG. 3 is represented in FIG. 5 and for an object with rounded slopes in FIG. 6. The image intensity variations in the upper portion of FIGS. 5 and 6 represent modulation contrast of phase gradients.

The sensitivity of this method of rendering phase objects visible is dependent upon the width of the filament image and the transmission ratio characteristics of the three sections of the modulator.

The relative transmissions of the different regions of the modulator can be selected to provide maximum contrast. Light passed by the central portion of the modulator becomes the background illumination in the image. A dark gray background furnishes maximum contrast for illuminated refractive index gradients. There must be a difference in intensities between the region of the modulator to either side of the central region. The central slit is chosen to have a transmittance that is quite low, providing a relatively dark gray background. Region 21 has approximately one-half the transmittance of the central region; the transmittance of the other region 20 is chosen close to 100%. The ratio between the transmission of regions 20, 21 is a measure of the modulation contrast possible. As the ratio increases, the contrast between two sides of small objects increases. An additional advantage of this choice of transmittances for regions 20,21 is that a three-dimensional image is observable. Another result of this choice of modulator transmittance is that the axial plane of interference in the image plane is exceptionally narrow, permitting what is known as optical sectioning to occur. In many respects, the appearance of the image in this type of microscope, modulation contrast, is similar to that produced by differential interference contrast microscope.

When the three or more regions of the modulator are of different colors, additional information about the object can be revealed in the image. Blue color is suggested for the central region 19 which will provide a blue background for those parts of the image not representing phase gradients. The eye is least sensitive to blue. The other colors will stand out more sharply, providing greater identification of gradients. Color selection for the other regions can be many; for this explanation, the colors chosen are red in region 21 and yellow in region 20. In the image plane, similar refractive index gradients will be colored alike. When the optically plane glass plate 4 is tilted with respect to the perpendicular to the optic axis, the image of the filament is shifted to one side or the other of the matching central region 19 of the modulator 8. This shift of the beam of light alters the background illumination which is now a mixture of rays from the central region and the region to which this image was shifted. The extent of modulation contrast has been reduced for slopes in the direction of shift and increased for slopes in the other direction. The eye can detect similar gradients more readily in color than with a neutral density type modulator; thus, color will more readily reveal similar structures. One marked advantage of this modulation contrast microscope is that the colored sections of the modulator can be chosen with different light transmittances, as described in previous paragraphs, with a neutral density modulator. Then, the three-dimensional effect is observed because the neutral density modulator is combined with a colored image. In this new microscope system, the modulation contrast microscope, color separation and neutral density transmission can be selected independently of each other and of the adjustment of the optics, and can be fitted to the nature of the object examined, a characteristic not found in interference or phase contrast microscopes.

When desired, the three different regions of the modulator can be fabricated to provide different changes of phase, somewhat similar to the phase plate in a phase constant microscope, but markedly different in operation. However, the principle described in earlier paragraphs of different transmittance characteristics for the three regions of the modulator will produce an image of phase objects but without the artifact of the halo. In fact, the modulation contrast technique reveals that a major portion of the halo production is due to phase gradients which are clearly revealed in the modulation contrast microscope. Phase gradients cause halo and obscure information in the phase contrast microscope.

The modulation contrast principle can be applied to a microscope system for reflected light, as shown in FIG. 7. The optics used are the same as for a compound microscope utilizing epi illumination. The light from the illuminating source 22 is gathered by a lens 23 and passes through the beam displacement control 26. The source 22 is again a rectangular filament or ribbon filament lamp as shown and described above. The condenser 25 throws the light on a beam splitter 27, directing a beam through the objective 28 onto an opaque object 29. The light reflected by the opaque object passes through the objective to the Fourier transform plane 30 where the modulator is located. The light rays pass through the modulator to the image plane 31 which is magnified by the ocular 32 and imaged in the eye 33. The same latitude of modifications are available for the reflected microscope as those described for the transmitted light microscope.

Particularly in regard to the modulator configuration, suitable modifications are shown in FIGS. 8,9 and 10.

Referring to FIG. 8, there is shown still another embodiment of a modulator 30 according to this invention.

The modulator 30, which may be as indicated, a planar sheet of photographic film, has a clear area 31 and an offset area 32. The clear area has a transmittance of practically 100%, thus permitting light from the object to pass directly therethrough. The offset area 32 has a low transmittance substantially less than 100% and is offset to one side.

The image of the filament or the image of a suitable light aperture is focused within the area 32 as designated by 33. Hence, with no object present in the object plane, the light emanating from the filament or an aperture slit is concentrated within the area 32 of the modulator 30 positioned at the above described Fourier plane. In the offset modulator of FIG. 8, the light that would have been absorbed does not pass to the image plane. This corresponds to the above described modulator configurations shown in FIG. 2A as in that modulator, the light of gradients that would pass the dark side of the central modulator, also do not pass to the image plane.

Shown in FIG. 9 is still another modulator configuration.

The central region 38 is surrounded by the peripheral strips 36,37,39 and 40, each of these strips are of different transmittances, so this configuration functions as a variable modulator. The peripheral region, as indicated, controls the background of the image and regions of no gradient density.

Since contrast is dependent upon background intensity, the contrast of the system can be varied by matching the off axis slit or the filament image to either regions 36,37,39 or 40.

As indicated in the Figure, the aperture slit or filament is focused within the transmittance section labelled as 36. It could also be imaged or focused in regions 37,39 or 40, to therefore give different contrast relationships to the viewed image.

Referring to FIG. 10, there is shown an annulus 45 about a clear region 46 of a modulator 47. The slit or filament image 48 is focused at the Fourier plane where the modulator 47 is located as above described. In this arrangement on off axis slit or filament image does not have to be aligned or registered with a particular orientation relative to the modulator. The slit or light image merely has to fall within the region 45 as defined by the annular ring.

Thus the configuration of FIG. 10 eliminates alignment for each microscope.

The modulators shown above will operate to enhance the image and permit one to view so-called transparent objects. The theory of operation, as indicated by the mathematics, is consistent with known diffraction formulas.

Resolution is dependent upon the exit pupil of the Fourier plane which is approximately the clear region of the modulator. In a symmetric system, where the center region of the modulator is on the optic axis, the resolution approaches:

$$\lambda/NA\ obj$$

eqivalent to axial illumination. For maximum resolution, the center region is offset to the edge of the exit pupil, then the dark side of the modulator is outside the exit pupil. Under these conditions, resolution approaches $$\lambda/2NA\ obj$$

that of oblique illumination. The location of maximum energy for gradients is $\theta \approx i \pm \phi$ where i is the angle of incident illumination.

Thus, in either a symmetric or a non-symmetric (offset) system, the amplitude of the light rays can be affected to enable the viewing of the transparent object.

While as above indicated the invention has particular use in the field of microscopy, it is believed that many other uses for the modulation contrast technique are available and hence one skilled in the art may envision other embodiments without departing from the spirit and scope of this invention.

I claim:

1. An optical system particularly adapted for use in microscopy and useful for viewing phase objects with the aid of a light beam, comprising:
   (a) means including an objective and a condenser lens in an optical path for focussing said light beam at a predetermined plane in said optical path, said object located between said objective and condenser lenses in said optical path, with said predetermined plane manifesting a Fourier transform plane whereby the spatial frequencies of said object as well as the maximum energy for each point on said object's gradient are distributed,
   (b) modulator means located at said predetermined plane, said modulator means consisting essentially of three regions, a first specific density region of a finite width and of substantially uniform transmittance, with said first region positioned in said plane on said modulator being bounded on one side by a second region of a substantially different uniform density and on the other side by a third region of a substantially different density than said first or second regions, such that the light intensity may be modified about said first region in both a greater and lesser intensity, to cause modifications by said modulator means of the amplitude of said light beam relatively about said first region in both a greater and lesser intensity, with said modulator means at said predetermined plane occupying the entire optical path of said microscope, with said first region being of a grey density with one of said second and third being black and the other being clear, and
   (c) an illumination source positioned in a plane conjugate to said predetermined plane for illuminating said object, said illumination source comprising a lamp assembly of the type having a relatively planar filament arrangement to provide a rectangular illumination pattern capable of being registered at said first region of said means to cause light from said object to be altered by said modulator means to provide an image of said object appearing three dimensional.

2. A microscope, comprising in combination:
   (a) an illumination source having a relatively rectangular light pattern and positioned at a predetermined plane,
   (b) means for focussing said light pattern at a second plane in the optical path of said microscope designated as a Fourier transform plane and characterized in that spatial frequencies of an object and relatively maximum energy for each point on the gradient of the object are distributed,
   (c) a modulator consisting essentially of a central region of a given transmittivity and two adjacent regions thereto of a substantially different transmittivity from each other and said central region wherein the modulator occupies the entire optical path of said microscope manifesting a stepped transmittivity function along one axis of said modulator, with said light pattern registered at said central region to cause light intensity to be modified about said central region in both a greater and lesser intensity, said modulator positioned at said second plane and operative to alter the amplitude of said light pattern as emanating from an object about said central region in both a greater and lesser intensity and strictly according to said given transmittivity regions, (d) means for displaying said altered amplitude light pattern to obtain an image of said object with said image appearing three dimensional.

3. The microscope according to claim 2 wherein said illumination source comprises a lamp assembly of the type having a filament whose light pattern can be focussed at said second plane.

4. In a microscope of the type employing means for supporting an object at an object position, means for providing a beam of rays of light for illuminating the object, a condenser means for concentrating the beam on the object position, an objective focused on the object position for receiving the beam after it has left the object and an image plane for viewing or displaying the object, the improvement therewith of apparatus for displaying a phase object, comprising:

(a) an illumination lamp source having a rectangular pattern positioned at a plane in the optical path of said microscope, said plane forming an image in the optical path of said microscope at a conjugate plane at which both the spatial frequencies of the object and maximum energy for each point on the gradient of the object can be distributed, said conjugate plane manifesting a Fourier transform plane, and (b) modulation contrast means located at said conjugate plane in said optical path for modifying light passing therethrough at said image plane, said means consisting essentially of three adjacent transmittance regions of substantially different density one from the other and capable of converting phase gradients to viewable contrast information, with a first region positioned in the conjugate plane on said modulation contrast means such that light intensity may be modified relatively about said first region in a greater and lesser intensity due to said adjacent regions, said modulation contrast means manifesting a stepped transmittance function along one axis with the image of said source registered at said first region, whereby a phase object can be viewed or displayed in three dimensional appearance by said modulation contrast means modifying light about said first region in both a greater and lesser intensity, said transmittance regions characterized in that said three regions include respective areas which essentially occupy the entire conjugate plane.

5. The microscope according to claim 4 wherein said illumination source comprises a lamp assembly of the type having a relatively closely would filament capable of being registered at said conjugate plane.

6. An optical system particularly adapted for viewing a phase object, comprising:

(a) a lamp assembly having a relatively rectangular filament configuration and operative to provide a substantially rectangular light image for illuminating said phase object, (b) a lens assembly including a condenser and an objective lens for focusing said image at a predetermined plane in the optical path of said objective and condenser lenses, said plane manifesting a Fourier transform plane and characterized in that spatial frequencies of the object and relatively maximum energy for each point on the gradient of the object are distributed, (c) modulation means located at said plane for selectively adsorbing energy according to said gradient of said object to enable a user to view said phase object with viewable contrast effects due to the operation of said modulation means, said modulation means consisting essentially of three regions, a first central region of a given density with said central region positioned in said transform plane on said modulation means such that the light intensity may be modified about said central region in both a greater and lesser intensity, a second region immediately adjacent and to the right of said central region of a substantially different density and a third region immediately adjacent and to the left of said central region and of a different density than either of said other regions with said three regions occupying essentially said entire plane, whereby there is an abrupt change in density between said adjacent regions manifesting a stepped density function along one axis of said modulation means with the image of said lamp assembly registered solely within said central region, said modulation means operating to adsorb energy about said central region in both a greater and lesser intensity, said density of said central region being grey with one of said adjacent regions being clear and said other being black, and (d) viewing means located in said optical path and operative to view said phase object with said image of said phase object appearing three dimensional.

7. An optical system particularly adapted for use in microscopy and useful for viewing phase objects with the aid of a light beam, comprising:

(a) means including an objective and a condenser lens in an optical oath for focussing said light beam at a predetermined plane in said optical path, said object located between said objective and condenser lenses in said optical path, with said predetermined plane manifesting a Fourier transform plane whereby the spatial frequencies of said object as well as the maximum energy for each point on said object's gradient are distributed, (b) modulator means located at said predetermined plane consisting essentially of a first specific density region with said first region positioned in said plane on said modulator such that the light intensity may be modified about said first region in both a greater and lesser intensity, a second immediately adjacent region of a substantially different density to the right of said first region and a third region of a substantially different density than said first or second regions and located to the left of said first region, whereby there is an abrupt change in density between said adjacent regions manifesting a stepped density function along one axis of said modulator means causing modifications by said means of the amplitude of said light beam relatively about said first region in both a greater and lesser intensity, with said modulator means occupying the entire optical path of said microscope, and (c) an illumination source positioned in a plane conjugate to said predetermined plane for illuminating said object, said illumination source comprising a lamp assembly of the type having a relatively planar filament arrangement to provide a rectangular illumination pattern capable of being registered at said first region of said means to cause light from said object to be altered by said modulator means to provide an image of said object appearing three dimensional.

8. The optical system according to claim 7 wherein said lamp assembly is of the type employing a rectangular filament.

9. The optical system according to claim 7 wherein said lamp assembly is of the type employing a ribbon filament.

* * * * *